April 4, 1961 W. A. HASBANY 2,977,979
REGULATING VALVE

Filed Nov. 10, 1958 2 Sheets-Sheet 2

INVENTOR.
Woodrow A. Hasbany.
BY
Kenneth C. Witt
ATTORNEY.

United States Patent Office 2,977,979
Patented Apr. 4, 1961

2,977,979

REGULATING VALVE

Woodrow A. Hasbany, South Bend, Ind., assignor to Clark Equipment Company, a corporation of Michigan Filed Nov. 10, 1958, Ser. No. 772,920

6 Claims. (Cl. 137—495)

This invention relates to improvements in valve means for use in fluid operated control systems. More particularly, the valve means of this invention is constructed to control and regulate fluid pressures, and it may be disposed, for example, between a source of pressurized fluid and a device operated thereby such as a transmission clutch.

Briefly, this invention constitutes an improvement in so-called "inching" control valve mechanisms. Such control valve mechanisms may be used in regulating pressure to a fluid operated clutch of the type found in industrial lift trucks and other machines. Specifically, such a control valve means is frequently constructed to permit an immediate relief of a portion of the clutch application pressure followed by regulated decrease or increase in the pressure of fluid supplied to a fluid operated clutch whereby the latter may be gradually disengaged or engaged by the operator. One particular use of this type of regulating valve, as mentioned, contemplates the control of a fluid pressure actuated clutch for the transmission of an industrial lift truck. In such a vehicle, it is often necessary to hold the truck stationary while the lift fork or like material engaging device is operated at a speed corresponding to full engine speed without shifting the transmission to neutral position. It is desirable in such circumstances to be able to "inch" the vehicle forwardly or reversely, as desired, to make possible its accurate positioning and the handling of material.

Conventionally, the vehicle transmission has been kept in gear and the brakes of the vehicle have been employed to control "inching" of the vehicle. This method of control is undesirable because it requires considerable pressure to be applied to the brake pedal by the operator of the vehicle and also causes undesirable wear of the brake linings.

Various control and regulating valves for performing the above stated function in conjunction with power shifted transmissions employing fluid pressure actuated transmission clutches have been disclosed previously as exemplified by U.S. Patents No. 2,786,368 dated March 26, 1957, and 2,814,371 dated November 26, 1957.

In order to carry out the above mentioned "inching" feature, valve means, such as described in the above identified patents have been provided to effect improved gradual engagement and disengagement of the vehicle clutch, after relief of excess pressures in the system, by operating such valve means in conjunction with the application and release of the vehicle brake system. The operation of such valve means may be either hydraulic by application of fluid pressure in the brake system, or mechanical by means of a linkage connection with the brake pedal of the vehicle. In such structures when the brakes are actuated the valve means shifts to a position interrupting fluid flow to a clutch control valve and effects controlled partial deactuation of the clutch means thus providing control of the torque to the wheels of the vehicle. When the brake pedal is released, the valve means is returned to its normal position reestablishing communication between the clutch control valve and the source of fluid under pressure. As a result of the above arrangement, drive between the input and output shafts of the vehicle transmission may be controlled to permit "inching" of the vehicle without interfering with the operations of raising and lowering a load.

The valve means of the present invention constitutes an improvement upon the structures of the above identified patents and may be generally characterized as an improved arrangement of a spool type valve having a suitable porting system and a novel arrangement of opposing spring means therein, so as to provide an accurate, but rugged valve means capable of relieving overpressures to gain a workable pressure which is thereafter regulated to control a transmission clutch of a vehicle such that the pressure of the clutch, or other controlled device, is balanced against a spring in order to regulate the clutch pressure automatically at a value responsive to the position of the brake pedal or other controlling device.

With the foregoing in mind, it is a primary object of the present invention to provide new and improved regulating valve means having pressure relief and regulating features for use in fluid operated control systems.

Another object of the present invention is to provide a new and improved inching valve for use in industrial lift trucks having a fluid pressure actuated transmission clutch to the end that the vehicle's clutch mechanism may be gradually engaged or disengaged at the will of the operator by operating the vehicle's brake system.

Still another object of the present invention is to provide a new and improved inching valve means for industrial lift trucks and like vehicles which is universally adaptable for either hydraulic or mechanical operation at the manipulation of a foot pedal associated with the vehicle's brake system.

A still further object of the present invention is to provide a new and improved inching valve means for controlling the fluid pressure to a clutch mechanism in a vehicle, for initially relieving excess pressure on the clutch and then balancing the actuating pressure of the clutch against a spring to thereby regulate the clutch pressure automatically at a value responsive to the position of the vehicle brake pedal or other controlling device.

A still further object of the present invention is to provide various alternative structural arrangements and embodiments of a new and improved regulating valve means for controlling the fluid pressure to a fluid actuated clutch or other device in a vehicle.

A still further object of the present invention is to a new and improved inching valve structure which may be readily substituted for existing valve means in a vehicle with a minimum of modification thereto.

A still further object of the present invention is to provide a new and improved regulating valve for controlling the fluid pressure to a fluid actuated clutch mechanism of a vehicle, having a minimum number of parts, which is of simple and rugged construction, is efficient and reliable in operation, and is inexpensive to manufacture.

The above and other objects, features and advantages of the present invention will be apparent to those familiar with the art from the following detailed description of a preferred embodiment thereof as shown in the accompanying drawing forming a part hereof and wherein.

Figure 1:
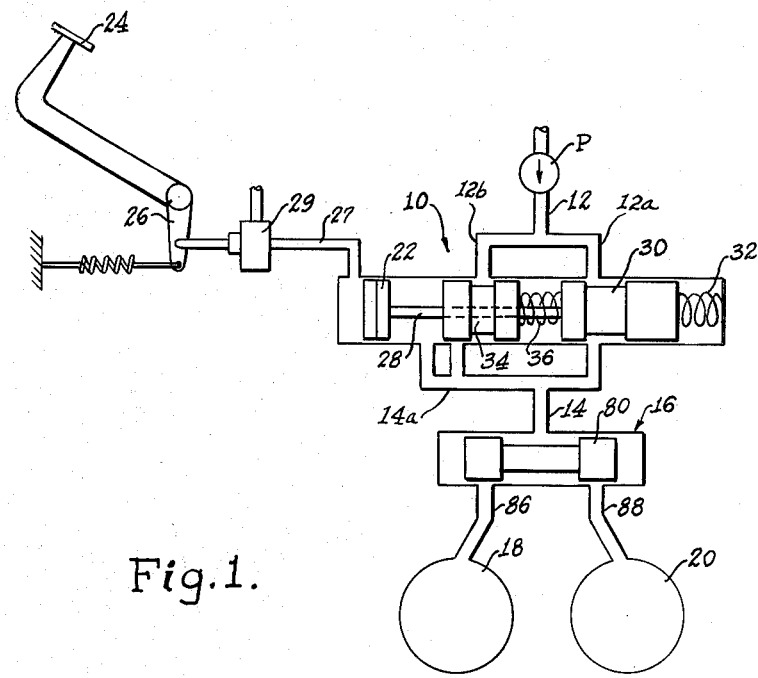
Figure 1 is a schematic representation of a typical fluid system in which the improved valve of the present invention finds utility.

As seen in Figure 1, the new and improved regulating valve 10 of the present invention is employed in a fluid circuit of an industrial lift truck. Valve 10 serves to control the pressure of fluid supplied by way of inlet 12 from the pump P which may be driven by the engine of the vehicle, to a conduit 14 leading to a clutch direction selector 16. Selector 16 controls the actuation of reverse and forward fluid pressure actuated clutches 18 and 20, respectively, in the vehicle's transmission. Valve 10 includes a piston 22 which is shiftable in response to actuation of a brake pedal of the vehicle as indicated generally at 24. Brake pedal 24 is connected with piston 22 by a suitable linkage system indicated generally at 26. The piston 22 is actuated by hydraulic means, in this instance, by conducting fluid thereto by means of a conduit connection 27 with the master cylinder 29 of the vehicle's braking system as will appear hereinafter.

Rightward movement of the piston 22 is transmitted by means of a rod 28 to a spool 30. The spool 30 moves in opposition to the bias of a compression spring 32 and sufficient movement of the spool 30 cuts off the flow of fluid under pressure from the pump P through inlet branch 12a to the selected clutch by closing the conduit means 14. A secondary spool 34 is mounted for axial sliding movement upon the rod 28 to produce a regulating action. The spool 34 receives fluid under pressure from the pump by way of inlet branch 12b. The spool 34 is subjected to the biasing force of a compression spring 36. Movement of the spool 34 is counteracted by force resulting from the fluid pressure in conduit branch 14a which is the clutch pressure, and thus a balance between the forces results, depending upon the position of the brake pedal 24. The regulating action in the present invention thus is effected responsively to the adjusted clutch pressure as contrasted to a regulation of the inlet pressure as in the aforementioned Patent No. 2,814,371, for example. The regulating valve means 10 of the present invention is more sensitive and more rapid in operation than the previous types of inching valve structures for accomplishing a similar function.

Without going into details at this point, it is pointed out that the operation of the spool 34 in response to movement of the brake pedal 24 serves to admit only a restricted amount of fluid from the inlet branch 12b to the conduit branch 14a and thereby regulates the pressure of fluid supplied to the clutch. Essentially, the mechanism is constructed so that initial depression of the brake pedal 24 serves to cut off fluid supply through branch 12a and further depression of the brake pedal regulates the clutch pressure such that it is responsive to brake pressure and the position of the brake pedal 24. Thus, as brake pressure is increased, the clutch pressure is decreased until ultimately the brake is fully on and the clutch is fully disengaged. Conversely, release of the brake pedal 24 opens the fluid circuit from the pump to the clutch so that the latter is fully engaged.

Figure 2:
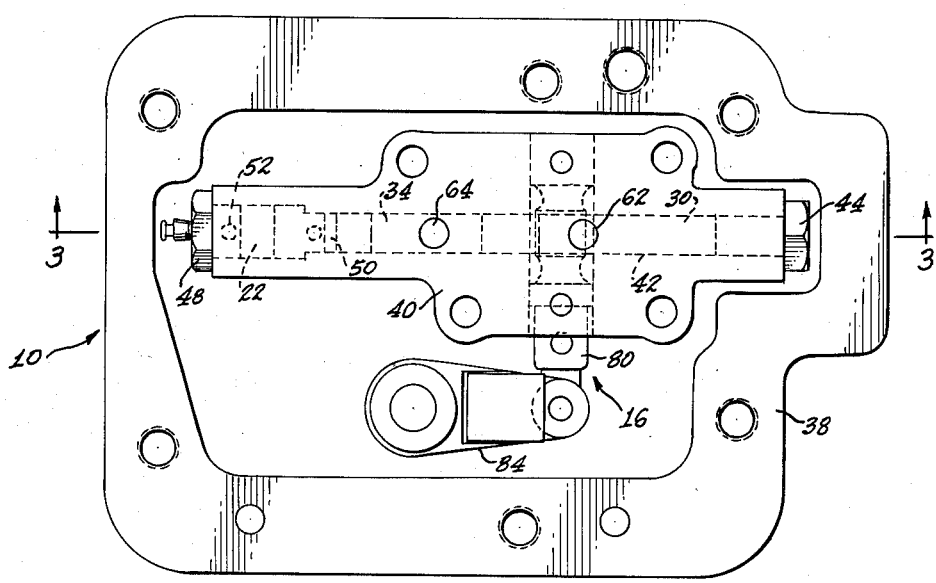
Figure 2 is a bottom plan view of one embodiment of the improved valve of the present invention.
Figure 3:
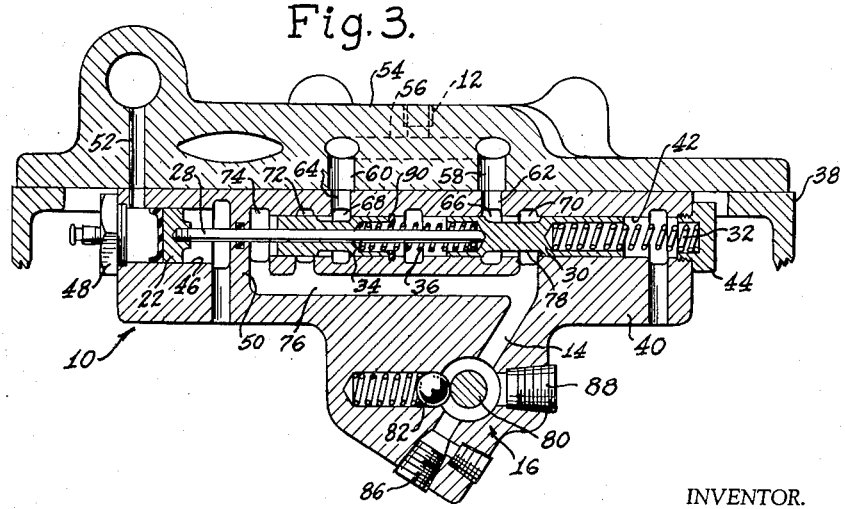
Figure 3 is a longitudinal cross-sectional view of the valve taken substantially along the line 3—3 of Figure 2.

Turning now to the particulars of the improved valve means 10 as shown in Figures 2 and 3 of the drawings, it will be understood that the valve 10 is carried within a suitable housing 38 preferably mounted on the vehicle transmission. The valve 10 includes a body portion 40 having an internal bore or chamber 42 in which the spools 30 and 34 are mounted for axial sliding movement. One end of the bore 42 is suitably sealed off by means of a closure plug 44. The opposite end of the body portion 40 is provided with a slightly enlarged internal bore 46 which is concentric with the bore 42 and the piston 22 is mounted for axial sliding movement therein. The end of bore 46 is suitably sealed off by means of a closure plug 48. As may be seen, the body portion 40 is provided with a suitable dividing wall 50 which isolates the bores 42 and 46 from one another. The body portion 40 is provided with an inlet means for pressure fluid from the vehicle's brake system through the bore 52 (corresponding to conduit 27 in Figure 1) connected with the master cylinder 29 and communicating with the bore 46.

When the vehicle's brakes are applied, fluid under pressure is admitted into the bore 46 through the bore 52 to the left hand side of the spool or piston 22 and exerts a force thereon tending to move it toward the right as viewed in Figure 3. The rod 28, as previously mentioned, is secured to the piston 22 and passes through the dividing wall 50, being suitably sealed by means of an O ring or other suitable means. The rod 28 extends to the right and passes freely through the valve spool 34 and thence into engagement with the valve spool 30. Movement of the piston 22 is thus transmitted into movement of the spool 30. The compression spring 32 is suitably retained within the bore 42 between the end of spool 30 and the closure plug 44 and tends to resist movement of spool 30 toward the right. The compression spring 36 is likewise suitably retained between the valve spools 30 and 34.

The inlet 12, which communicates with the hydraulic pump of the vehicle's transmission, is directed through a suitable cover member 54 where it is directed by means of a bore 56 into a pair of spaced passageways 58 and 60 which correspond respectively to 12a and 12b in Figure 1. The passageways 58 and 60 communicate, respectively, with spaced ports 62 and 64 in the body portion 40 to deliver the fluid under pressure to annular grooves 66 and 68 formed in the bore 42. Immediately to the right of annular groove 66, the bore 42 is provided with an annular groove 70 which communicates with the conduit means 14. Immediately to the left of annular groove 68, the bore 42 is also provided with an additional pair of spaced annular grooves 72 and 74 both of which communicate with an equalizing passageway 76 (corresponding to 14a in Figure 1) leading to the conduit means 14.

Under normal operating conditions of the vehicle, that is, with the brakes released, pressurized fluid from the inlet 12 flows at full supply pressure via the annular groove 66 and around a suitable annular groove 78 formed in the valve spool 30, thence by way of the annular groove 70 into the conduit means 14 where it is delivered to the direction selector means 16 which controls operation of the fluid clutch mechanisms for the vehicle. Such direction selector means includes a double acting valve spool 80 herein disposed transversely of the axis of the valve body portion 40. A spring loaded ball 82 serves as a detent means for maintaining the selected position of spool 80. Positioning of spool 80 is in response to arcuate actuation of a crank lever 84 having connection with a selector control lever (not shown) available to the vehicle's operator. The positioning of the selector spool 80 serves to control the passage of pressurized fluid to conduits 86 or 88 to thus control the operation of forward or reverse transmission direction clutches 18 and 20. In this regard, note that the spool 80 has three positions of operation, neutral as shown in Figure 1, or to either side of that position to selectively admit pressurized fluid to either of the two direction clutches 18 or 20.

The foregoing sets forth the essential elements which comprise the improved pressure regulating or inching control valve of the present invention. Now, in order to acquaint those familiar in the art with the use and operation of this device, particularly as it is associated with the schematic circuit set forth in Figure 1, the descriptive material which follows is directed to the operation of valve 10 in a fork lift truck.

As stated hereinbefore, pressurized fluid is supplied to the valve 10 through the inlet passage 12. Such fluid is delivered to the annular chambers near the mid sections of each of the spools 30 and 34 via the annular grooves 66 and 68, respectively. Normally, the valve 10 is positioned substantially as viewed in Figure 3 of the drawings with the spools 30 and 34 in the positions therein shown. The spool 34 is in its extreme right position and is prevented from additional movement in that direction by means of a snap ring 90 or other suitable retaining means. The pressurized fluid from the pump is then delivered at unrestricted pressure around the spool 30 to the clutch direction selector means 16 for actuation of either the forward or reverse clutch, as desired, depending upon the operating position of the selector means.

If the operator now depresses the brake pedal 24, the linkage means 26 is actuated and thus causes fluid under pressure from the vehicle's braking system to be admitted to the bore 46 at the left hand side of piston 22 via the master cylinder 29, conduit 27 and lateral bore 52. The rate at which fluid is admitted to the conduit 27 is in proportion to the degree of depression of the brake pedal 24. The brake fluid under pressure thus urges the piston 22 toward the right and the rod 28 imparts a corresponding degree of movement in the same direction to the spool 30 against the bias of compression spring 32. The land portion at the left end of spool 30 is thus moved over the annular groove 66 and sufficient movement thereof cuts off the flow of fluid under pressure to the conduit 14 around the spool 30. A regulating action then occurs by the action of the spool 34 which is freely movable axially upon the rod 28. The force of spring 36 urges the spool 34 toward the left thereby putting annular groove 68 in communication with annular groove 72. This movement is counteracted by the force exerted by the pressure in conduit 76 acting upon the left hand end of spool 34 which is equal to the pressure now acting upon the clutch. A balance between the above-mentioned forces results, depending upon the position of the brake pedal, which causes a regulation between the land portion at the left hand end of spool 34 and the annular groove 72 so as to provide a clutch pressure which is responsive to brake pressure and the degree of movement of the brake pedal 24. Thus, as the brake presssure is increased the clutch pressure is decreased until ultimately the brake is fully on and the clutch is fully disengaged. Conversely, release of the brake pedal 24 allows the piston 22, rod 28 and spool 30 to move to the left under the bias of compression spring 32 to change the balance of spool 34 (by changing the support point of spring 36) and ultimately to open the circuit from the pump to the clutch around spool 30 so that the clutch is fully engaged. The spool 34 will then be returned to the position shown in Figure 3.

Following the foregoing outline of the operation of the new and improved valve means 10, it will be realized that the present structure provides an effective and simple means for "inching" an industrial lift truck. The operator merely depresses the brake pedal and a regulating action occurs which is highly sensitive and responsive to the degree of brake application to thereby regulate the supply of fluid to the clutch whereby the "inching" operation may be readily effected. It will be appreciated that there is ordinarily a continuous flow of pressurized fluid to the clutch in an apparatus of this type, to make up for leakage and sometimes because of a bleed hole in the clutch chamber which remains open; thus it is possible to regulate the clutch application pressure by regulating the flow of fluid to the clutch.

While there has been described and illustrated herein an embodiment of the invention adapted for hydraulic operation by fluid under pressure from the vehicle's brake system, it will be apparent to those skilled in the art that it would be possible, if desired, to adapted this regulating valve for operation by means of a mechanical linkage connection between the brake pedal of the vehicle and rod 28.

From the foregoing, it is believed that the concept and features of the present invention will be clearly understood by those familiar in the art. While the invention has been disclosed and described by way of reference to a certain preferred embodiment thereof, it is obvious that numerous changes, modifications and substitutions of equivalents may be made therein without departing from the spirit and scope of the invention. As a consequence, it is not intended that the invention shall be limited to the specific form described and disclosed herein nor otherwise than by the terms of the appended claims.

I claim:

1. A pressure regulating valve of the character described, said valve comprising a valve body having a longitudinal cylindrical bore therein, a pressure inlet and a pressure outlet communicating with said bore, a first valve spool slidably arranged in said bore for varying the flow of pressure fluid between said inlet and said outlet, piston means in said bore adapted and arranged to act on said valve spool, means for adjusting the position of said piston and thus said valve spool in said bore, return spring means in said bore and operable upon said valve spool in opposition to said adjusting means, a regulating valve spool in said bore communicating with said inlet and said outlet, said regulating valve spool being substantially hydraulically balanced relative to the pressure at said inlet, said regulating valve spool being slidable within said bore independently of said valve spool, regulating passage means in said body communicating with said bore and said outlet and adapted and arranged to hydraulically unbalance said regulating valve spool in response to the pressure existing at said outlet, and regulating spring means in said bore urging said regulating valve spool in opposition to the hydraulic unbalance thereof, the operation of the regulating valve being such that upon movement of said first valve spool to reduce the flow of fluid from inlet to outlet below a predetermined amount the said regulating valve spool is caused to slide within said bore to supplement the flow of pressble within said bore independently of said first valve spool, sure fluid between said inlet and said outlet to maintain a predetermined pressure at said outlet.

2. A pressure regulating valve of the character specified in claim 1, wherein said piston includes an elongated operating rod and said regulating valve spool is positioned between said piston and said first valve spool and is freely slidable relative to said operating rod.

3. A pressure regulating valve of the character described, said valve comprising a valve body having a longitudinal cylindrical bore therein, a pressure inlet and a pressure outlet communicating with said bore, a piston in said valve body having an elongated operating rod extending into said bore, a first valve spool slidably arranged in said bore for varying the flow of pressure fluid between said inlet and said outlet, said operating rod being adapted and arranged to abut said first valve spool, operating means for moving said piston within said body to thereby adjust the position of said first valve spool, a second valve spool in said bore and freely slidable upon and relative to said operating rod, said second valve spool communicating with said inlet and said outlet and being substantially hydraulically balanced relative to the pressure at said inlet, regulating passage means communicating with said outlet and with said bore and adapted and arranged to hydraulically unbalance said second valve spool responsively to the pressure at said outlet, and regulating spring means mounted within said bore between said first and second valve spools and surrounding said operating rod, said regulating spring means biasing said second valve spool in opposition to the said hydraulic unbalance thereof, whereby upon movement of said first valve spool to vary the fluid flow between said inlet and said outlet said second valve spool causes a regulating action to occur which maintains a selectable regulated pressure at said outlet.

4. A pressure regulating valve of the character specified in claim 3 wherein said first and second valve spools communicate with said inlet by way of separate passage means and communicate with said outlet by way of separate passage means.

5. A regulating valve as specified in claim 3, wherein the means for moving said piston includes an additional fluid pressure inlet in said valve body communicating with a source of fluid under pressure.

6. A pressure regulating valve mechanism comprising a body portion having an elongated chamber therein, a fluid inlet passage communicating with the said chamber at a first location, a fluid outlet passage communicating with the said chamber at a second location, a first spool member slidably disposed in the said chamber and adapted to provide substantially unrestricted direct communication between the said inlet and the said outlet passages in one position of the said first spool member and to cut off communication between the said inlet and outlet passages in another position of the said first spool member, a second spool member slidably disposed in the said chamber in axially spaced apart relation to the said first spool member, a regulating passageway providing a connection between the said outlet passage and the said chamber at a third location, the said regulating passageway being adapted for admitting fluid at outlet pressure to the said chamber for exerting an axial force proportional to the said outlet pressure on the said second spool member toward the said first spool member, additional passageway means providing additional communication between the said inlet passage and the said outlet passage through the said chamber, the said second spool being arranged to variably restrict and to cut off the additional communication between the inlet and outlet passages through the said additional passageway means, regulating spring means in the said chamber between the said spool members exerting a force on the said second spool member opposing the said axial force produced by the action of the outlet pressure thereon, and means for varying the position of the said first spool member to cut off direct communication between the said inlet and said outlet passages and to vary the force exerted by the said spring on the said second spool member thereby providing restriction of communication between the inlet and outlet passages through the additional passageway for regulating the said outlet pressure.

References Cited in the file of this patent

UNITED STATES PATENTS

| | | |
|---|---|---|
| 219,114 | Ross | Sept. 2, 1879 |
| 297,373 | Freese | Apr. 22, 1884 |
| 2,808,068 | Thomas | Oct. 1, 1957 |
| 2,814,371 | Bolster | Nov. 26, 1957 |

UNITED STATES PATENT OFFICE
CERTIFICATION OF CORRECTION

Patent No. 2,977,979            April 4, 1961

Woodrow A. Hasbany

It is hereby certified that error appears in the above numbered patent requiring correction and that the said Letters Patent should read as corrected below.

Column 6, line 23, after "said", second occurrence, insert -- first --.

Signed and sealed this 5th day of September 1961.

(SEAL)
Attest:

ERNEST W. SWIDER            DAVID L. LADD

Attesting Officer            Commissioner of Patents